(12) United States Patent
Kanamori

(10) Patent No.: US 7,860,649 B2
(45) Date of Patent: Dec. 28, 2010

(54) VEHICLE POSITION DETECTING SYSTEM AND METHOD

(75) Inventor: Takashi Kanamori, Nagoya (JP)

(73) Assignee: Denso Corporation, Kariya (JP)

( * ) Notice: Subject to any disclaimer, the term of this patent is extended or adjusted under 35 U.S.C. 154(b) by 522 days.

(21) Appl. No.: 11/882,139

(22) Filed: Jul. 31, 2007

(65) Prior Publication Data

US 2008/0059062 A1    Mar. 6, 2008

(30) Foreign Application Priority Data

Sep. 1, 2006   (JP) ............................. 2006-237768

(51) Int. Cl.
   *G01C 21/30* (2006.01)
(52) U.S. Cl. .................................... 701/210
(58) Field of Classification Search ................ 701/210, 701/211; 342/357.09, 357.13, 357.2
   See application file for complete search history.

(56) References Cited

U.S. PATENT DOCUMENTS

| | | | |
|---|---|---|---|
| 5,774,824 A | 6/1998 | Streit et al. | |
| 6,178,377 B1 | 1/2001 | Ishihara et al. | |
| 6,484,093 B1* | 11/2002 | Ito et al. | 701/211 |
| 6,662,105 B1 | 12/2003 | Tada et al. | |
| 6,904,362 B2* | 6/2005 | Nakashima et al. | 701/211 |
| 7,071,843 B2 | 7/2006 | Hashida et al. | |
| 2002/0169551 A1* | 11/2002 | Inoue et al. | 701/213 |
| 2003/0163253 A1 | 8/2003 | Lee et al. | |
| 2006/0111837 A1 | 5/2006 | Tauchi | |
| 2006/0217884 A1* | 9/2006 | Adachi | 701/210 |

FOREIGN PATENT DOCUMENTS

| | | |
|---|---|---|
| EP | 0875877 | 4/1998 |
| JP | A-8-265826 | 10/1996 |

OTHER PUBLICATIONS

Office Action dated Dec. 17, 2009 from the German Patent and Trademark Office in the corresponding patent application No. 10 2007 039 200.3-54 (English translation enclosed).

* cited by examiner

*Primary Examiner*—Mark Hellner
(74) *Attorney, Agent, or Firm*—Posz Law Group, PLC

(57) ABSTRACT

An information processing station having map data is provided at an external position outside of a vehicle. In-vehicle equipment determines a vehicular travel path of the vehicle, and transmits the determined vehicular travel path to the information processing station. The information processing station executes map matching processing of matching the vehicular travel path with a road on the map data, thereby correcting the present position of the vehicle. Accordingly, the present position of the vehicle can be determined with high precision without providing expensive map data to the vehicle.

9 Claims, 5 Drawing Sheets

VEHICLE POSITION DETECTING SYSTEM AND METHOD

CROSS REFERENCE TO RELATED APPLICATION

This application is based on and incorporates herein by reference Japanese Patent Application No. 2006-237768 filed on Sep. 1, 2006.

FIELD OF THE INVENTION

The present invention relates to a vehicle position detecting system and method for detecting the present position of a vehicle by using position indicating information transmitted from artificial satellites.

BACKGROUND OF THE INVENTION

A conventional vehicle position detecting system uses position indicating information received from artificial satellites to detect the present position of a vehicle. Artificial satellites of global positioning system (GPS) are generally used as the artificial satellites. Position coordinate data and time data of each GPS artificial satellite are successively transmitted as position indicating information from the artificial satellite concerned. In-vehicle equipment receives data from four or more GPS artificial satellites, and the coordinate at which the vehicle is located at present is calculated based on the difference in propagation time in which the data transmitted from each GPS artificial satellite propagates to the vehicle.

The present position determined by this technique may remarkably degraded in precision in accordance with environmental conditions such as a case where obstacles exist around the vehicle and data can be received from only three or less GPS artificial satellites, a case where the vehicle is located at a position at which reflecting structures such as buildings, etc. exist around the vehicle and data from one GPS artificial satellite is received through plural paths, that is, multi-path occurs, or the like.

A map matching correcting technique (for example, EP 0875877 B1, JP 10-307037A) is known as a technique of detecting the accurate present position even under such a condition as described above. According to this technique, the travel path of the vehicle is created and it is matched with roads on map data to correct the present position.

Map data are needed to perform the map matching correction. However, the map data are generally expensive, and thus a position detecting device by which the accurate present position can be detected by performing the map matching correction has been expensive.

SUMMARY OF THE INVENTION

The present invention has an object to provide a vehicle position detecting system that can determine the present position of a vehicle with high precision without providing any expensive map data to the vehicle.

According to the present invention, in-vehicle equipment receives position indicating information from artificial satellites and detects a position of the vehicle based on the position indicating information. The in-vehicle equipment or a position correction station determines a vehicular travel path. The position correction station is provided at an external position outside of the vehicle. The position correction station map-matches the vehicular travel path with some road on a map stored in a map data storage device of the position correction station, thereby determining a corrected present position of the vehicle. The position correction station transmits the corrected present position to the in-vehicle equipment.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
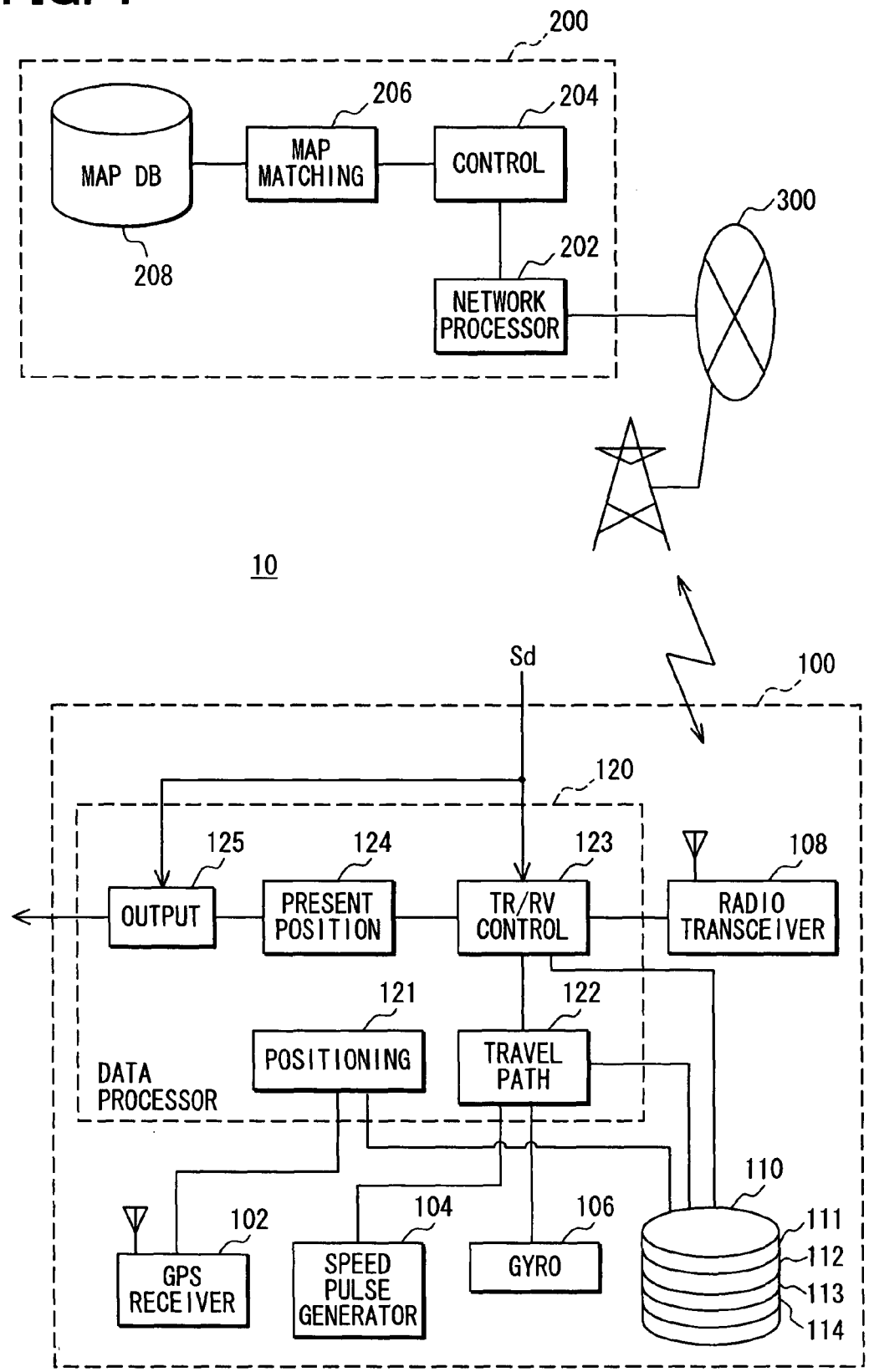
FIG. 1 is a block diagram showing a vehicle position detecting system according to a first embodiment of the present invention.

Referring to FIG. 1, a vehicle position detecting system 10 is equipped with in-vehicle equipment 100 and an information processing station 200 having a function as a position correction station. The in-vehicle equipment 100 has a GPS receiver 102, a vehicle speed pulse generator 104, a gyro unit 106, a radio transceiver (transmitter/receiver) 108, a storage device 110 and a data processor 120.

The GPS receiver 102 receives position indicating data which are successively transmitted from plural GPS artificial satellites, and supply the received data to the data processor 120.

The vehicle speed pulse generator 104 generates a vehicle speed pulse corresponding to the rotation speed of a tire wheel or a rotating member and outputs the vehicle speed pulse to the data processor 120.

The gyro unit 106 functions as an azimuth sensor, so that the rotational angular velocity of the vehicle, that is, the angular velocity of the vehicle, is detected by the gyro. Then, an angular displacement signal indicating the angular velocity thus detected is output to the data processor 120.

The radio transceiver 108 carries out radio communications with a public communication line network 300. It transmits the signal transmitted from the data processor 120 through the public communication line network 300 to the information processing station 200, or it receives the signal transmitted from the information processing station 200 through the public communication line network 300 and supplies the received signal to the data processor 120.

The storage device 110 is a rewritable storage device such as a hard disk or the like, and it is equipped with a vehicle speed data storage area 111, a travel distance storage area 112, a GPS positioning data storage area 113 and a vehicular travel path data storage area 114.

The data processor 120 is a computer having CPU, ROM, RAM (not shown), etc. CPU executes programs pre-stored in ROM while using the temporarily storage function of RAM. The data processor 120 functions as a positioning unit 121, a vehicular travel path determining unit 122, the transmitter/receiver controller 123, a present position determining unit 124 and an output unit 125.

The positioning unit 121 successively determines the present position of the vehicle by using the position indicating data received by the GPS receiver 102. In the following description, the present position of the vehicle determined by using this position indicating data will be referred to as "GPS positioning position". The positioning unit 121 stores the GPS positioning position into the GPS positioning data storage area 113 of the storage device 110.

The vehicular travel path determining unit 122 successively determines the vehicular travel path based on the signals from the vehicle speed pulse generator 104, the gyro unit 106 and the measuring unit 121. This vehicular travel path is a path, which a vehicle has traveled, and includes plural pass points through which the vehicle has traveled or passed, angular displacement at the pass points, the distance between neighboring two pass points (inter-pass-point distance) and the GPS positioning position of at least one pass point. The number of pass points is set to a preset fixed value.

The pass point is determined based on the vehicle speed pulse from the vehicle speed pulse generator 104 or the angular displacement signal from the gyro unit 106. That is, the vehicle speed is successively calculated based on the vehicle speed pulse, and the time when the calculated vehicle speed satisfies a preset reference value is set as a pass point. Furthermore, the angular velocity represented by the angular displacement signal is integrated with respect to time to calculate angular displacement over a predetermined period, and the point when the calculated angular displacement is equal to a predetermined angle or more is set as a pass point.

The angular displacement and the inter-pass-point distance at the pass point thus determined are respectively determined based on the angular displacement signal and the vehicle speed pulse, and then stored in the vehicular travel path data storage area 114 of the storage device 110.

As described above, the number of pass points constituting the vehicular travel path is set to a fixed value, and thus when the number of pass points stored in the vehicular travel path data storage area 114 is equal to that fixed value, the information of the oldest pass point is deleted and the information of the latest pass point is stored.

The transmitter/receiver controller 123 is mounted in the vehicle, and transmits the vehicular travel path of the vehicle from the radio transceiver 108 through the public communication line network 300 to the information processing station 200, when a present position request signal Sd is supplied to the user from an information supply system for supplying predetermined information based on the present position of the vehicle. The transmitted vehicular travel path at this time is achieved by adding the vehicular travel path stored in the vehicular travel path data storage area 114 of the storage device 110 to the GPS positioning position determined by the positioning unit 121 at that time point.

The information supply system may be a traffic jam information supply system for supplying traffic jam information around the present position, a system for supplying information of POI (Point of Interest) around the present position (i.e., position of places which may be of interest), a theft detecting system for detecting a theft and informing that the theft has occurred and giving the present position of the vehicle, an emergency report system for automatically reporting the present position to an emergency center when the vehicle has an accident, etc. Therefore, the present position request signal Sd is supplied from the above system when the vehicle stops or parks and at predetermined constant time intervals afterwards, when a theft preventing device has been actuated, or when a safety device such as a seat belt fixing device/air-bag/impact detecting device has been actuated.

When the radio transceiver 108 receives a corrected present position which is sent from the information processing station 200 in response to the transmission of the vehicular travel path, the transmitter/receiver controller 123 outputs the corrected present position to the present position determining unit 124.

The present position determining unit 124 sets the corrected present position supplied from the transmitter/receiver controller 123 as the actual present position of the vehicle. The determined present position is output to the output unit 125.

The output unit 125 outputs the supplied present position to the information supply system which outputted the present position request signal Sd.

Next, the information processing station 200 will be described. The information processing station 200 is equipped with a network processor 202, a controller 204, a map matching processor 206 and a map data storage device 208.

The network processor 202 functions as a transmitter device and the receiver device of the information processing station 200. It receives a vehicular travel path transmitted from the in-vehicle equipment 100 through the public communication line network 300, and outputs the received vehicular travel path to the controller 204. Furthermore, when the corrected present position is supplied from the controller 204, the corrected present position is transmitted through the public communication line network 300 to the in-vehicle equipment 100.

The controller 204 and the map matching processor 206 are a well-known computer having CPU, ROM, RAM (not shown), etc. One computer may function as the controller 204 and the map matching processor 206, or the controller 204 may comprise one computer while the map matching processor 206 comprises another computer.

The controller 204 has a function of controlling the network processor 202 and the map matching processor 206. It supplies the vehicular travel path received by the network processor 202 to the map matching processor 206, supplies the corrected present position determined by the map matching processor 206 to the network processor 202, and makes the network processor 202 transmit the corrected present position to the in-vehicle equipment 100.

Furthermore, the controller 204 also executes the processing for supplying information such as traffic jam and point of interest (POI), determined by the information supply system described above based on the corrected present position, and instructs the network processor 202 to transmit the determined information to the in-vehicle equipment 100.

The map matching processor 206 functions as present position correcting unit, and executes map matching processing on the vehicular travel path supplied from the controller 204. Specifically, the map range in which the map matching processing is to be executed is determined based on the positional coordinates of any one of the pass points contained in the vehicular travel path supplied from the controller 204, and then the road which matches best with the vehicular travel path is determined from roads in the range concerned. Subsequently, of the two end points of the vehicular travel path, the position of the one whose position has been determined later is determined as the corrected present position. Then, the corrected present position thus determined is output to the controller 204. The controller 204 which obtains the corrected present position from the map matching processor 206 executes the processing of transmitting the corrected present position to the in-vehicle equipment 100, etc. as described above.

Figure 2:
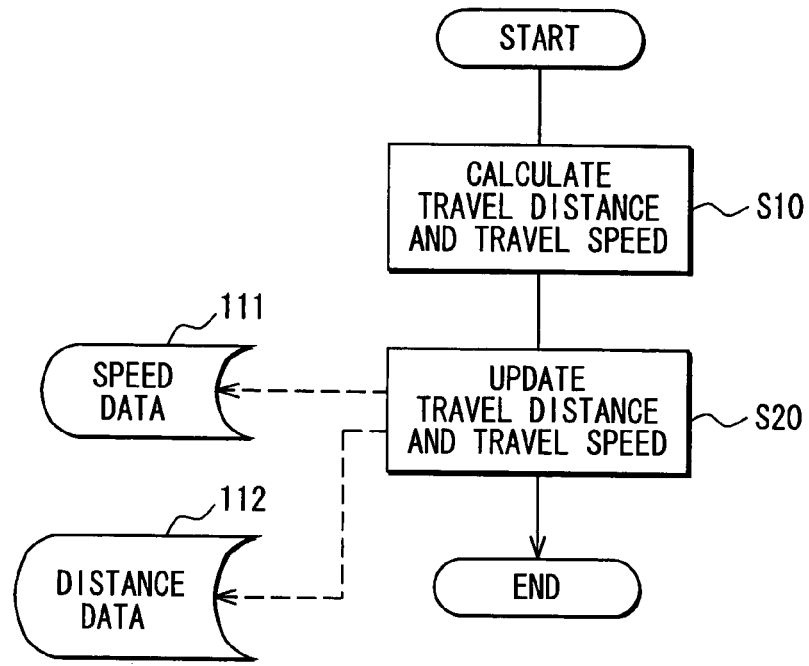
FIG. 2 is a first flowchart showing the processing of a positioning unit and a vehicular travel path determining unit which is executed in a data processor of in-vehicle equipment in the first embodiment.
Figure 3:
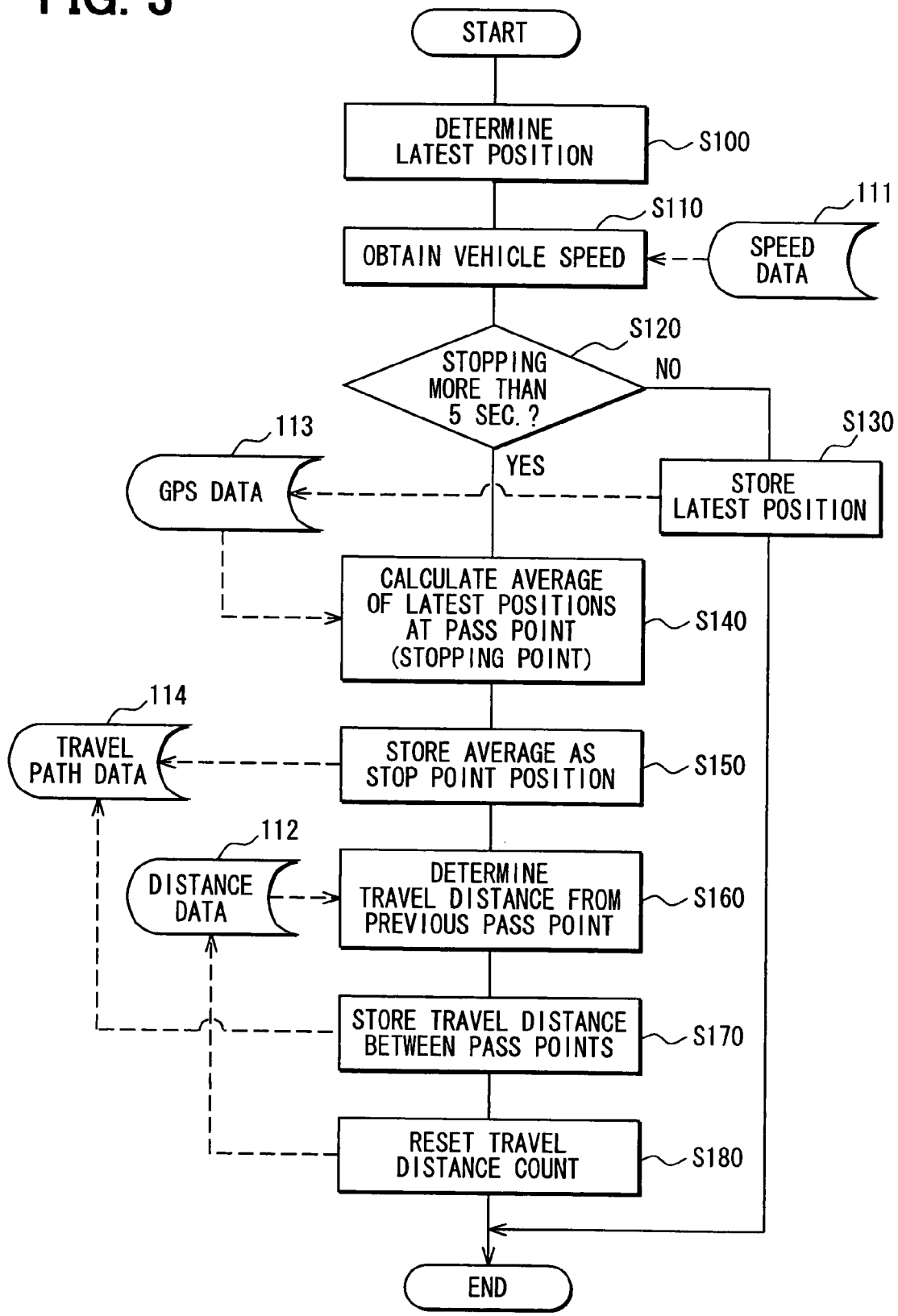
FIG. 3 is a second flowchart showing the processing of the positioning unit and the vehicular travel path determining unit which is executed in the data processor of the in-vehicle equipment in the first embodiment.
Figure 4:
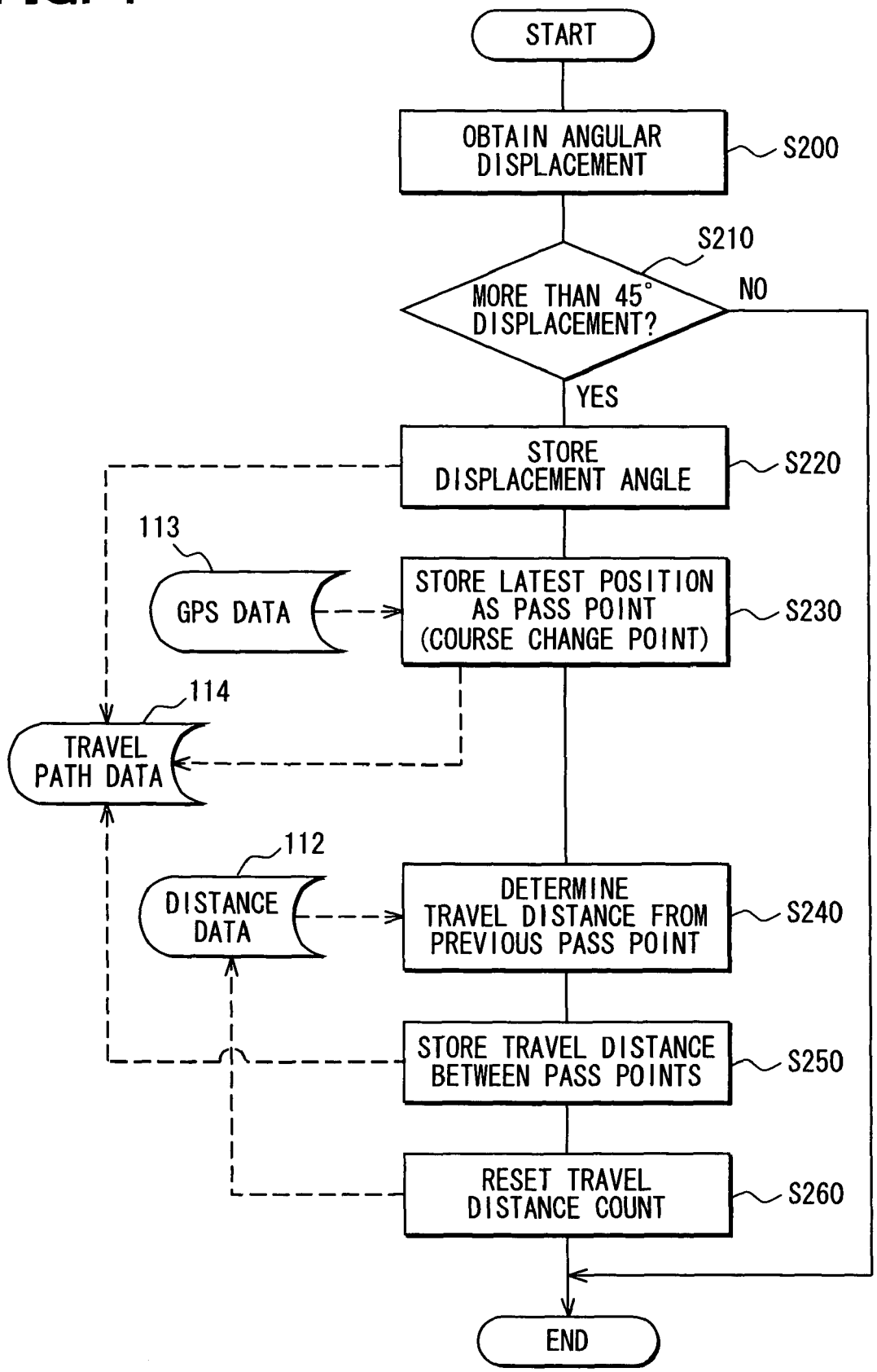
FIG. 4 is a third flowchart showing the processing of the positioning unit and the vehicular travel path determining unit which is executed in the data processor of the in-vehicle equipment in the first embodiment.

Next, the processing of the positioning unit 121 and the vehicular travel path determining unit 122 which is executed in the data processor 120 of the in-vehicle equipment 100 will be described with reference to the flowchart shown in FIGS. 2 to 4. In FIGS. 2 to 4, broken lines represent storage or reading of data. Furthermore, the operations shown in FIGS. 2 to 4 are executed in parallel by time-divided processing or the like. However, the operations of FIGS. 2 to 4 may alternatively be executed successively in a predetermined order.

In FIG. 2, in step S10, based on the number of vehicle speed pulses during the time period from when this step S10 was previously executed until this present execution of step S10, the distance the vehicle has moved during this time period is calculated, and also the vehicle travel speed is calculated based on the pulse interval of the vehicle speed pulses.

In the subsequent step S20, the vehicle speed stored in the vehicle speed data storage area 111 of the storage device 110 is updated to the latest value calculated in step S10, and the presently calculated travel distance is added to the travel distance storage area 112 of the storage device 110 so that the stored travel distance is updated.

In FIG. 3, in step S100, the position indicating data are obtained from the GPS receiver 102 to determine the latest GPS positioning position. In the subsequent step S110, the present vehicle speed is obtained by referring to the vehicle speed data storage area 111. In the subsequent step S120, it is checked whether the state that the vehicle speed is equal to "0" continued for five or more seconds. This is the check as to whether the vehicle is in a stopping state.

If the determination of the step S120 is negative, the GPS positioning position determined in step S100 is stored in the GPS positioning data storage area 113 of the storage device 110 in step S130. After this step S130 is executed, the processing is started again from the step S100.

On the other hand, if the determination of the step S120 is positive, the processing proceeds to step S140 to calculate the average value of the GPS positioning position during the time period in which the vehicle speed remains "0". Each GPS positioning position has a measurement error, however, the position at which the vehicle is stopped can be more accurately determined by calculating the average value of the GPS positioning position during the vehicle-speed "0" period.

In the subsequent step S150, the average value calculated in step S140 is stored in the vehicular travel path data storage area 114 as the position of a stop point, which is one type of pass point. Furthermore, the processing proceeds to step S160 to determine the travel distance stored in the travel distance storage area 112 as the distance from the previous pass point. The travel distance stored in the travel distance storage area 112 is successively integrated in step S20 of FIG. 2, and also it is reset to "0" every time a pass point is determined as described later, so that the travel distance stored can be regarded as the distance from the previous pass point.

In the subsequent step S170, the distance determined in step S160, that is, the distance between pass points, is stored in the vehicular travel path data storage area 114. Then, in the subsequent step S180, the travel distance value stored in the travel distance storage area 112 is reset to "0". After this step S180 is executed, the processing is repeated from step S100.

In FIG. 4, in step S200, the angular displacement signal from the gyro unit 106 is obtained. In the subsequent step S210, the angular displacement during a predetermined period is calculated based on the angular displacement signal obtained in step S10, and it is checked whether the angular displacement is equal to 45° or more. If the determination of the step S210 is negative, the processing is repeated from step S200.

On the other hand, if the determination of the step S210 is positive, the angular displacement calculated for the determination of the step S210 is stored in the vehicular travel path data storage unit 114 of the storage device 110 in step S220. Furthermore, the processing proceeds to step S230 to read out the present GPS positioning position from the GPS positioning data storage area 113 of the storage device 110, and the present GPS positioning position is stored in the vehicular travel path as the position of the pass point (in this case, in particular a course change point) at which the angular displacement stored in step S220 is made.

The processing of the subsequent steps S240 to 260 corresponds to the processing as the steps S160 to S180 of FIG. 3. In step S240, the travel distance stored in the travel distance storage area 112 is determined as the distance from the previous pass point. In the subsequent steps S250, the distance between pass points which is determined in step S240 is stored in the vehicular travel path data storage area 114. In the subsequent step S260, the travel distance value stored in the travel distance storage area 112 is reset to "0".

Figure 5:
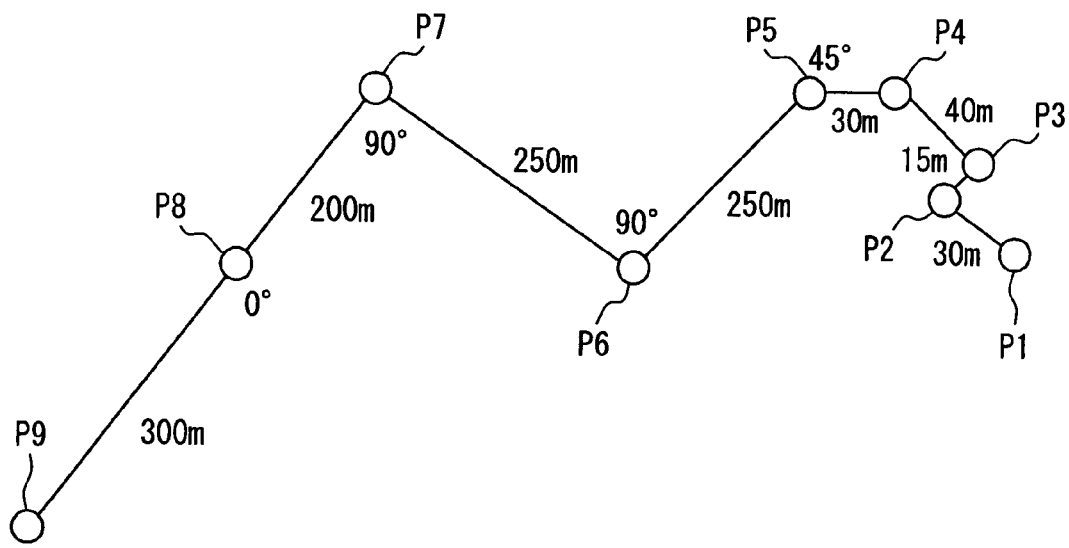
FIG. 5 is a diagram showing an example of the vehicular travel path obtained by executing the processing of FIGS. 2 to 4.

FIG. 5 is a diagram showing an example of the vehicular travel path determined by executing the operations of FIGS. 2 to 4. P1 to P9 represent pass points, and P1 represents the final position of the vehicle. The vehicular travel path is constructed by the pass points P1 to P9, the distance between respective adjacent pass points and the angular displacement at each pass point. In FIG. 5, some angular displacements are not shown.

At a pass point determined based on the determination that the vehicle stopped (the pass point P8 in the example), the angular displacement is not stored as shown in FIG. 3. The angular displacement in this case is set to "0°". However, the angular displacement may be detected and stored even at a pass point determined based on the determination that the vehicle is in the stopping state.

The vehicular travel path as exemplified in FIG. 5 is transmitted from the in-vehicle equipment 100 to the information processing station 200, and the map matching processing is executed in the information center 200.

According to this embodiment, the information processing station 200 having the map data is provided outside of the vehicle, and the in-vehicle equipment 100 determines the vehicular travel path of the vehicle and transmits the determined vehicular travel path to the information processing station 200. Then, the information processing station 200 executes the processing of matching the vehicular travel path with a road on the map, that is, executes the map matching processing, whereby the present position of the vehicle is corrected and the corrected present position is determined. Therefore, the present position of the vehicle can be determined with high precision without providing any expensive map data in the vehicle.

Furthermore, the information to be transmitted to the information processing station 200 is set to the vehicular travel path, and thus the information amount to be transmitted can be reduced as compared with the case where vehicular travel path creating information for creating a vehicular travel path itself is directly transmitted.

Still furthermore, in this embodiment, the time at which the vehicular travel path is transmitted from the in-vehicle equipment 100 to the information processing station 200 may be limited to the time at which a present position request signal Sd is transmitted from the information supply system equipped in the vehicle, and thus the number of times of transmission of the vehicular travel path information can be reduced. Accordingly, the power consumption and the communication cost for transmission of the vehicular travel path information can be reduced.

Second Embodiment

Figure 6:
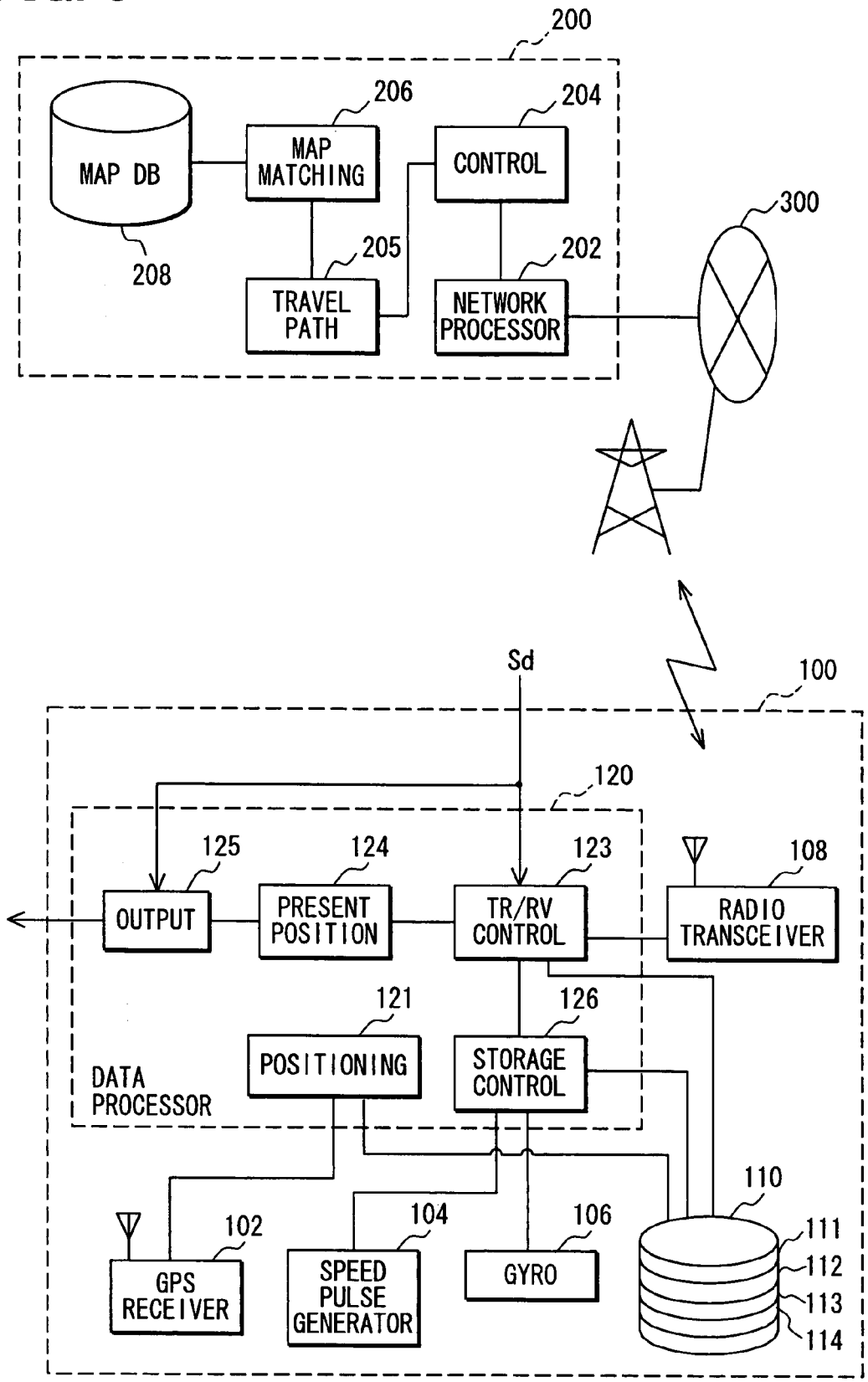
FIG. 6 is a block diagram showing a vehicle position detecting system according to a second embodiment of the present invention.

The first embodiment may be modified as shown in FIG. 6 as a second embodiment. That is, in this embodiment, a vehicular travel path determining unit 205 may be provided in the information processing station 200 in place of the vehicular travel path determining unit 122 of the first embodiment. The vehicular travel path determining unit 205 of the information processing station 200 determines the vehicular travel path by the same processing as the vehicular travel path determining unit 122, and outputs the determined vehicular travel path to the map matching processor 206.

In the second embodiment, a storage information controller 126 of the in-vehicle equipment 100 obtains the vehicle speed pulse and the angular displacement signal from the vehicle speed pulse generator 104 and the gyro unit 106 respectively, and stores the vehicle pulse and the angular displacement signal over the preset latest fixed time as vehicular travel path creating information in a vehicular travel path-creating information storage area 115 of the storage device 110. When the present position request signal Sd is supplied, the transmitter/receiver controller 123 transmits the vehicular travel path creating information stored in the vehicular travel path-creating information storage unit 115.

As in the case of the first embodiment, the vehicle position detecting system executes the map matching processing in the information processing station 200. Accordingly, as in the case of the first embodiment, the present position of the vehicle can be determined with high precision without providing any expensive map data to the vehicle. Furthermore, it is unnecessary to determine the vehicular travel path in the in-vehicle equipment 100, and thus the operation processing load in the in-vehicle equipment 100 can be reduced. Therefore, an inexpensive operation control device having a relatively low processing speed can be used, and thus the manufacturing cost of the in-vehicle equipment 100 can be reduced.

Furthermore, in the above embodiments, the course change point and the stop point are set to be pass points of the vehicular travel path; however, GPS positioning positions obtained at time intervals of fixed length may be set as the pass points.

Still further, in the above embodiments, the vehicular travel path is constructed from the distance between pass points and the angular displacement at the pass point. However, the vehicular travel path may be constructed from the coordinate positions of respective pass points in place of the distance between pass points and the angular displacement at the pass point.

The present invention is not limited to the above embodiments, and various modifications may further be made.

What is claimed is:

1. A vehicle position detecting system comprising:
   in-vehicle equipment for receiving position indicating information from artificial satellites and detecting a position of a vehicle based on the position indicating information;
   a map data storage device for storing map data; and
   a present position correcting unit for matching a vehicular travel path with some road on the map data stored in the map data storage device thereby determining a corrected present position of the vehicle, wherein
   the in-vehicle equipment includes a radio transmitter device and a transmission control unit for controlling the radio transmitter device to transmit vehicular travel path creating information for determining the vehicular travel path of the vehicle during a predetermined information transmission period, and wherein
   a position correction station is provided at an external position outside of the vehicle, and includes the map data storage device, the present position correcting unit, a receiver device for receiving the vehicular travel path creating information transmitted from the in-vehicle equipment, and a vehicular travel path determining unit for determining the vehicular travel path based on the vehicular travel path creating information received by the receiver device.

2. The vehicle position detecting system according to claim 1, wherein
   the vehicular travel path determining unit determines the vehicular travel path from positions of a plurality of pass points of the vehicle, and at least some of the pass points are course change points of the vehicle.

3. The vehicle position detecting system according to claim 1, wherein
   the vehicular travel path determining unit determines the vehicular travel path from positions of a plurality of pass points of the vehicle, and at least some of the pass points are stop points of the vehicle.

4. A vehicle position detecting method comprising:
   receiving position indicating information transmitted from artificial satellites by in-vehicle equipment provided in a vehicle and detecting a position of the vehicle based on the position indicating information;
   determining a vehicular travel path;
   map-matching the vehicular travel path with some road on a map stored in a map data storage device thereby determining a corrected present position of the vehicle, and
   transmitting vehicular travel path creating information, which includes a vehicle speed pulse and an angular displacement signal, from the in-vehicle equipment to a position correction station, which is provided at an external position outside of the vehicle and includes the map data storage device, wherein
   the determining and the map-matching are performed in the position correction station based on the vehicular travel path creating information received from the in-vehicle equipment and the map stored in the map data storage device, and wherein
   the corrected present position of the vehicle is transmitted from the position correction station to the in-vehicle equipment.

5. The vehicle position detecting method according to claim 4, further comprising:
   detecting, as pass points of the vehicle, stop points where the vehicle stops and course change points where the vehicle changes direction of travel, wherein the vehicle travel path is determined by connecting the stop points and the course change points of the vehicle in time sequence.

6. The vehicle position detecting system according to claim 1, wherein
the vehicular travel path creating information includes a plurality of pass points of the vehicle, and at least some of the pass points are course change points of the vehicle.

7. The vehicle position detecting system according to claim 1, wherein
the vehicular travel path creating information includes a plurality of pass points of the vehicle, and at least some of the pass points are stop points of the vehicle.

8. The vehicle position detecting system according to claim 1, wherein
the position correction station further includes a transmitter device for transmitting a corrected present position determined by the present position correcting unit to the in-vehicle equipment, and
the in-vehicle equipment further has a radio receiver device for receiving the corrected present position transmitted from transmitter device of the position correction station and a present position determining unit for setting the corrected present position received by the radio receiver device as a present position of the vehicle.

9. The vehicle position detecting system according to claim 1, wherein
the map data used for matching the vehicle travel path by the present position correcting unit is stored only in the map data storage device provided in the position correction station.

* * * * *